(12) United States Patent
Harada (10) Patent No.: US 7,428,197 B2
(45) Date of Patent: Sep. 23, 2008

(54) PLL CIRCUIT AND RECORDED INFORMATION PLAYBACK APPARATUS

(75) Inventor: Shingo Harada, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/802,318

(22) Filed: May 22, 2007

(65) Prior Publication Data
US 2007/0280080 A1 Dec. 6, 2007

(30) Foreign Application Priority Data
May 30, 2006 (JP) ............... 2006-149249

(51) Int. Cl.
*G11B 7/00* (2006.01)
(52) U.S. Cl. .................. 369/47.28; 369/59.2
(58) Field of Classification Search .............. None
See application file for complete search history.

(56) References Cited
U.S. PATENT DOCUMENTS 4,228,320 A * 10/1980 Celli et al. ................. 379/56.3
5,675,565 A * 10/1997 Taguchi et al. ........... 369/47.35
6,088,307 A *  7/2000 Fushimi et al. .......... 369/44.13
7,095,696 B2 *  8/2006 Nakajima et al. ........ 369/59.12

\* cited by examiner

*Primary Examiner*—Joseph Feild
*Assistant Examiner*—Peter Vincent Agustin
(74) *Attorney, Agent, or Firm*—Rader Fishman & Grauer PLLC; Ronald P. Kananen (57) ABSTRACT

A PLL circuit having an analog-to-digital converter; a phase error detecting circuit; and an oscillator, in which the phase error detecting circuit includes: phase error detecting means detecting a phase error from a data stream signal and a data stream signal 1 clock cycle earlier; absolute value comparing means detecting an absolute value of the phase error detected exceeding a predetermined threshold; holding means holding a polarity of the phase error, as of a timing of the detection by the absolute value comparing means, for a period of the detection; anticoincidence detecting means detecting anticoincidence between the polarity held by the holding means and a polarity of the phase error detected by the phase error detecting means; and polarity inverting means that provides the phase error detection signal by inverting the polarity of the phase error in detection of anticoincidence, or without inverting the polarity in detection of no anticoincidence.

5 Claims, 10 Drawing Sheets

PLL CIRCUIT AND RECORDED INFORMATION PLAYBACK APPARATUS

CROSS REFERENCES TO RELATED APPLICATIONS

The present document contains subject matter related to Japanese Patent Application JP 2006-149249 filed in the Japanese Patent Office on May 30, 2006, the entire contents of which are incorporated herein by reference.

BACKGROUND OF THE INVENTION

1. Field of the Invention

The present invention relates to a PLL (Phase-Locked Loop) circuit and a recorded information playback apparatus using the PLL circuit.

2. Description of Related Art

Recent optical disc technology is directed toward higher-density recording and higher-speed reading, as seen from a shift from DVDs (Digital Versatile Discs) to Blu-ray (registered trademark) discs. As a reading system adapted to such higher-density and higher-speed operation, a PRML (Partial Response Maximum Likelihood) system has been in use.

A read channel block adopting the PRML system operates roughly as follows. The high-frequency component of a signal read by an optical pickup from a disc medium is boosted by an equalizer in accordance with a PR equalizing system, and the analog output from the equalizer is digitized by an analog-to-digital converter (hereinafter denoted as "ADC") for output to a downstream digital signal processing block. Meanwhile, a PLL circuit is formed of the ADC, a phase error detecting circuit, a charge pump circuit, a loop filter, and a voltage-controlled oscillator (hereinafter denoted as "VCO" in a loop configuration. The PLL uses) a VCO clock as a sampling clock for the ADC.

In this read channel block, the PLL circuit feedback-controls the phase of the VCO clock so that a waveform read from the disc medium can be sampled at correct timings. Such a PLL circuit is generally called a clock data recovery circuit or a data synchronizer circuit in the field of recorded information playback apparatuses, such as disc players and magnetic tape players.

Here, how the phase error detecting circuit of the PLL circuit detects phase error will be described.

The phase error detecting circuit uses digital values resulting from the sampling by the ADC of an analog waveform input from the DC component that has been removed by an upstream high-pass filter and the like. When outputs from the ADC undergo a zero crossing, their values preceding and succeeding the zero crossing are added to calculate a phase error.

Let a case of Blu-ray discs be considered as an example. The Blu-ray standard adopts 17PP modulation as a data recording system. Thus, assuming that a reference clock cycle is 1T, it is configured such that the data width changes within a range of 2T to 8T. For ease of explanation, let a case be considered where a 2T signal is continuously inputted. Note that the continuous 2T signals are assumed to have sine waveforms, and the subsequent discussion will be based on this assumption.

Figure 7:
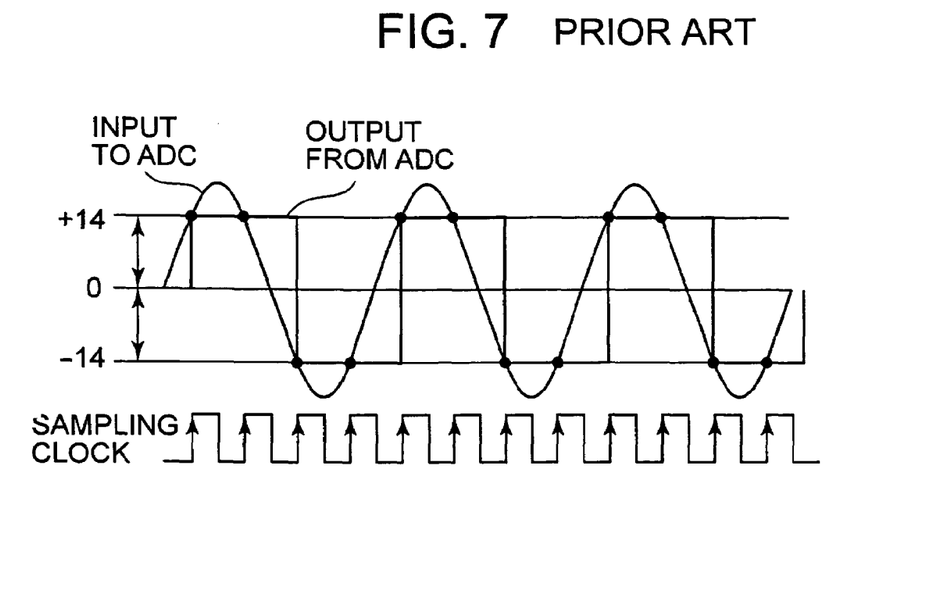
FIG. 7 is a timing waveform chart (part 1) for illustrating the operation of the phase error detecting circuit according to the related art example.

FIG. 7 shows a state in which the sampling clock is in correct phase, i.e., the sampling clock is phase-locked, when a waveform is read according to a PR {1, 2, 1} equalizing system. Note that the data amplitude is supposed to be 20 in this example. As an example of a phase error calculating formula in the PR {1, 2, 1} equalizing system, the following equation (1) is available:

$$(y[n-1]+y[n])*\text{sign}(y[n]) \text{ when } \text{sign}(y[n-1]) \neq \text{sign}(y[n]) \quad (1)$$

where y[n] represents an n-th sampled value and sign(y[n]) represents the sign of y[n].

A condition in which the above equation (1) yields "0", i.e., a condition in which the absolute values of two successive sampled values are equal when a zero crossing occurs between these two sampled values, is deemed as a phase-locked state. A specific circuit example for implementing this calculation is shown in FIG. 6.

Figure 6:
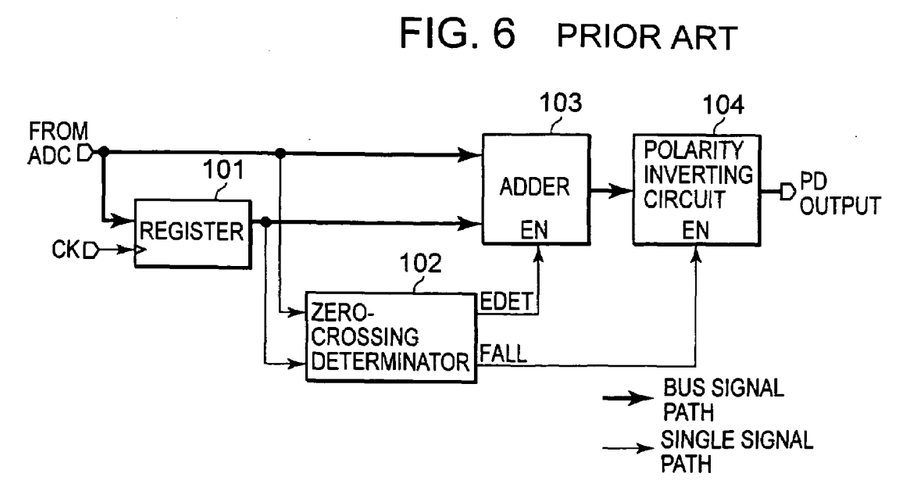
FIG. 6 is a block diagram showing a circuit example of a phase error detecting circuit according to a related art example.

In FIG. 6, an output from the ADC is held by a register 101 for a period of 1T for determination by a zero crossing determinator 102, which compares the polarity of a current value y[n] with that of a 1T-earlier value y[n−1], as to whether or not a zero crossing has occurred and also as to whether the zero crossing has occurred at the rising or falling of an input waveform. In this example, it is assumed that an EDET signal is set to "1" when a zero crossing has occurred, a FALL signal is set to "0" when the zero crossing has occurred at the rising of the waveform, and "1" when the zero crossing has occurred at the falling of the waveform.

An adder 103 adds two inputted signals when the EDET signal is "1". A polarity inverting circuit 104 does not invert the polarity of a sum from the adder 103 when the FALL signal is "0", but inverts the polarity when the FALL signal is "1" to provide a final phase error detection output.

In an example of FIG. 7 showing the phase-locked state of the sampling clock, "20 (amplitude)÷√2≈±14" are the sampled values outputted from the ADC, and the phase error detection output, i.e., the phase error, thus equals "0" according to the equation (1).

Figure 8:
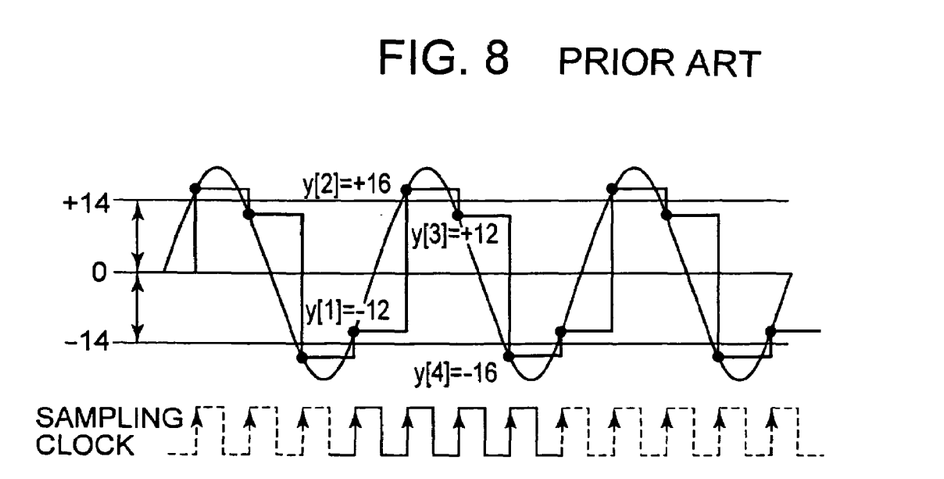
FIG. 8 is a timing waveform chart (part 2) for illustrating the operation of the phase error detecting circuit according to the related art example.

A status is shown in FIG. 8 in which the phase of the sampling clock lags a little bit behind the phase-locked state shown in FIG. 7. Due to the clock getting out of phase, the absolute values of sampled values are not equal before and after their respective zero crossings. In an example of FIG. 8, y[1]=−12 and y[2]=+16 before and after a zero crossing at the rising of an input waveform. A phase error calculated here equals +4 according to the equation (1). Likewise, e.g., y[3]=+12 and y[4]=−16 before and after a zero crossing at the falling, and thus a phase error calculated here is also +4 according to the equation (1).

Figure 9:
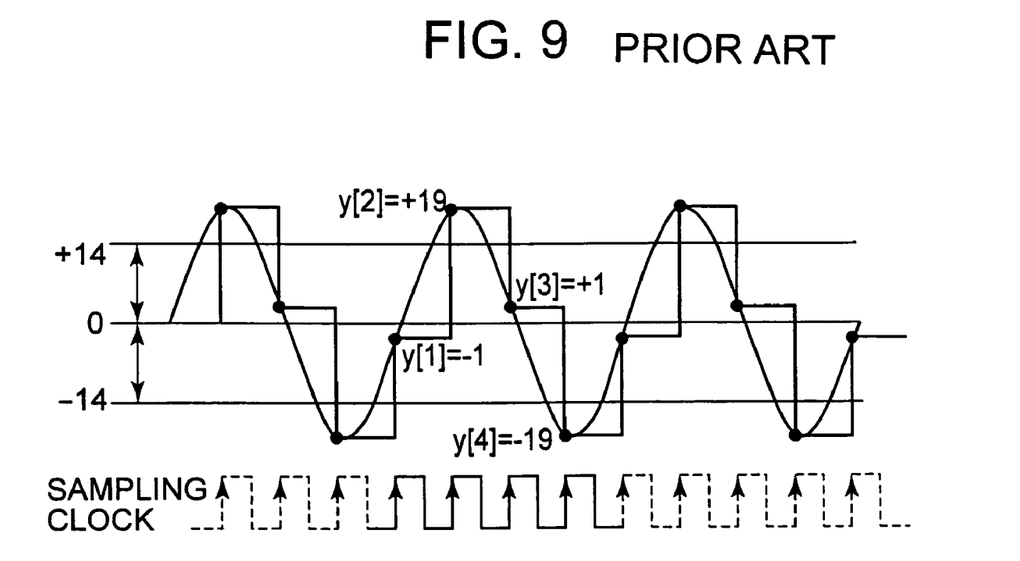
FIG. 9 is a timing waveform chart (part 3) for illustrating the operation of the phase error detecting circuit according to the related art example.

Next, a case is shown in FIG. 9 where the phase of the sampling clock lags further behind. In this example, a phase shift is a little less than 0.5T=π[rad]. Since y[1]=−1 and y[2]=+19, a phase error here is calculated as +18. Similarly, since y[3]=+1 and y[4]=−19, a phase error here is also calculated as +18.

Figure 10:
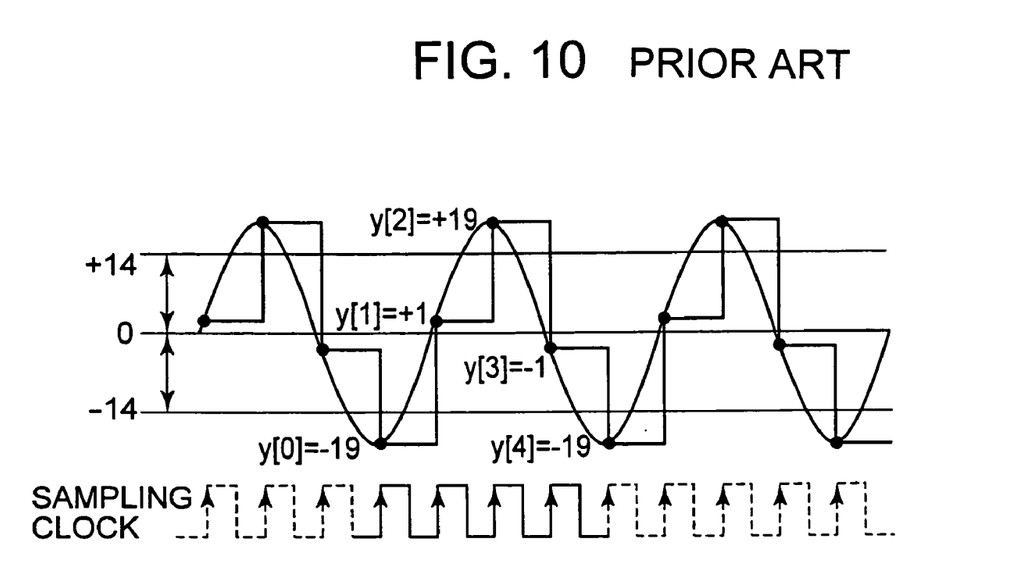
FIG. 10 is a timing waveform chart (part 4) for illustrating the operation of the phase error detecting circuit according to the related art example.

When the phase of the sampling clock lags still further behind so that the phase shift amount exceeds π[rad], the polarity of the phase error is inverted. In an example shown in FIG. 10, y[1] already moves to the positive side by the phase shift exceeding π [rad]. Thus, following the rule that a phase error is calculated using sampled values preceding and succeeding a zero crossing, a phase error here is calculated from y[0] and y[1]. Since y[0]=−19 and y[1]=+1, the phase error here is calculated as −18. Likewise, in the case of a zero crossing at the falling, y[2]=+19 and y[3]=−1, and thus a phase error also is calculated as −18.

Figure 11:
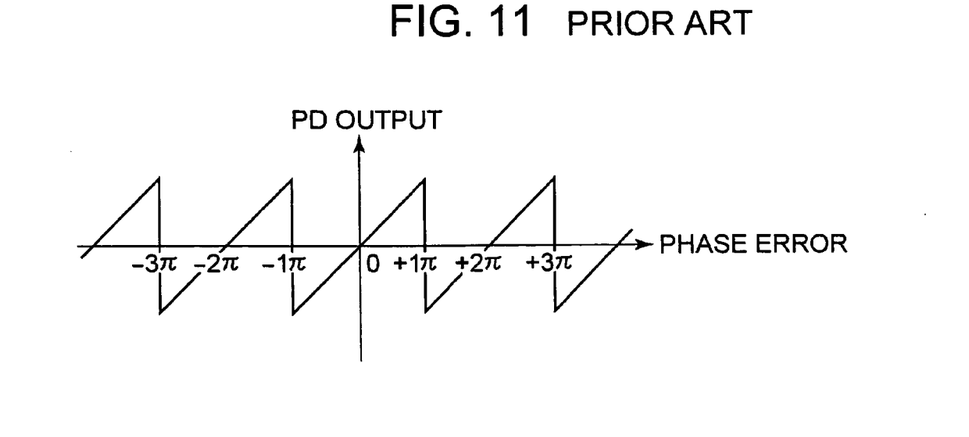
FIG. 11 is a diagram showing the phase error detection characteristics of the phase error detecting circuit according to the related art example.

Thus, when schematically expressed, the phase error detection characteristics of the phase error detecting circuit have the shape shown in FIG. 11, exhibiting a monotonously increasing characteristic that is point-symmetrical with respect to the origin when the phase error stays between $-\pi$[rad] and $+\pi$[rad], and repeating the same characteristic for every $2\pi$[rad] after the phase error exceeds $\pm\pi$[rad].

By the way, while the phase error detecting circuit has the above phase error detection characteristics, this phase error detecting circuit addresses a problem that frequency locking cannot be implemented when an initial frequency error is large. This problem will be described below.

Referring now to FIG. 11, let a case be considered where there is only an initial frequency error with no initial phase error (="0"). Since the initial phase error is "0", the phase error detection output initially stays at the origin of FIG. 11. However, the presence of the initial frequency error causes the phase error to increase gradually as time passes from the start of a PLL operation. In FIG. 11, the phase error detection output gradually grows outward from the origin.

Here, if the initial frequency error is extremely small and thus the phase error increasing speed is sufficiently low compared with a loop operating band width of the PLL, the frequency error is corrected by the PLL operation before the phase error exceeds $\pm\pi$[rad] to put the phase error detection output back to the origin of FIG. 11. However, if the initial frequency error is large and thus the phase error increases at a speed faster than the PLL operating band width, the PLL functions to correct the frequency error as long as the phase error is $\pm\pi$[rad] or less, but upon an excess of $\pm\pi$[rad], the polarity of the phase error detection output is inverted, causing the PLL to encourage the frequency error. As a result, the phase error also aggravates, and thereafter the same phenomenon is repeated for every $\pm 2n\pi$ (where n is an arbitrary natural number). Because of such a phenomenon, the phase error detection output average equals "0" when observed over a long period of time, thus not allowing the frequency offset to be corrected.

Figure 12:
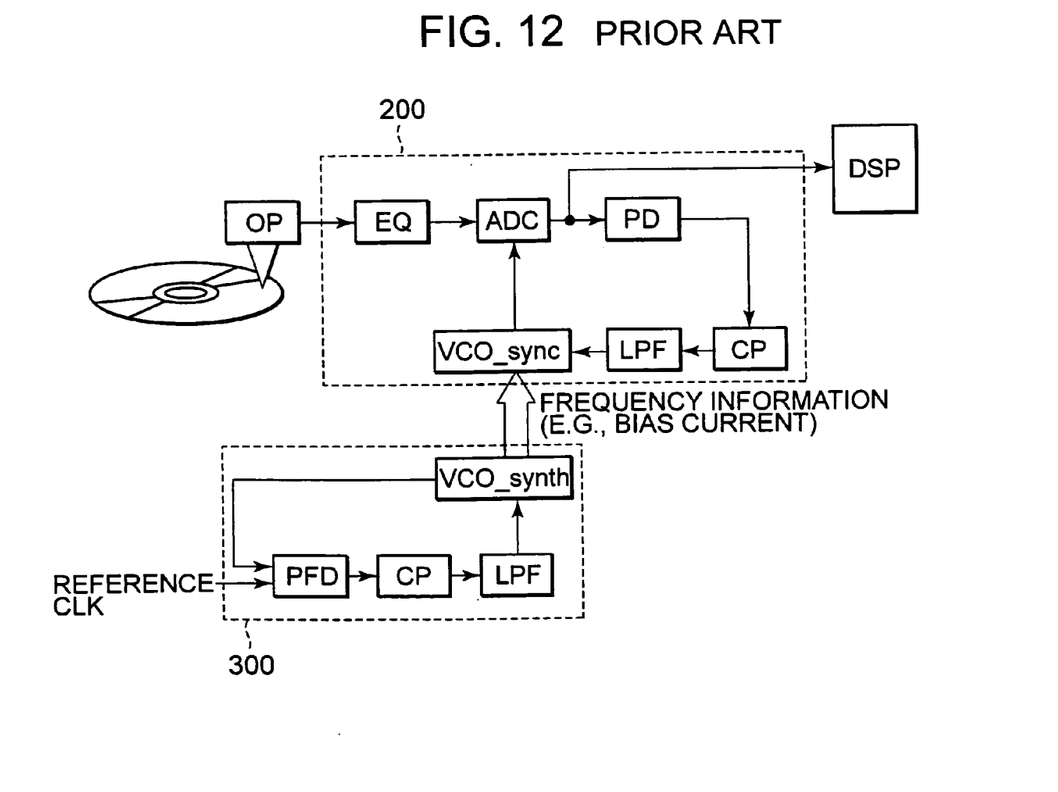
FIG. 12 is a block diagram showing a configuration example of a read channel block having both a data synchronizer circuit and a frequency synthesizer circuit.

In order to compensate for the extremely weak frequency-locking performance of the phase error detecting circuit, in the read channel block, a frequency synthesizer circuit 300 is additionally provided, as shown in FIG. 12. Utilizing a general feature that the reference frequency of a sampling clock can be obtained from the spinning speed of a disc from which data is currently read, the frequency synthesizer circuit 300 generates frequency information to a data synchronizer circuit 200 that uses the PLL circuit including the above-mentioned phase error detecting circuit.

This frequency synthesizer circuit 300 uses an ordinary PLL circuit that can lock both frequency and phase through edge comparison, and thus operates so as to lock onto a data rate reference frequency clock for data being currently read.

Here, the frequency synthesizer circuit 300 generally uses a voltage-controlled oscillator VCO_synth that is the same as a voltage-controlled oscillator VCO_sync used for the data synchronizer circuit 200. And, by giving oscillating frequency information of the voltage-controlled oscillator VCO_synth to the voltage-controlled oscillator VCO_sync beforehand using, e.g., a bias current or the like, an initial frequency offset in the data synchronizer circuit 200 is suppressed within a small range.

Here, a phase detecting circuit used for the frequency synthesizer circuit 300 will be described briefly.

Figure 13:
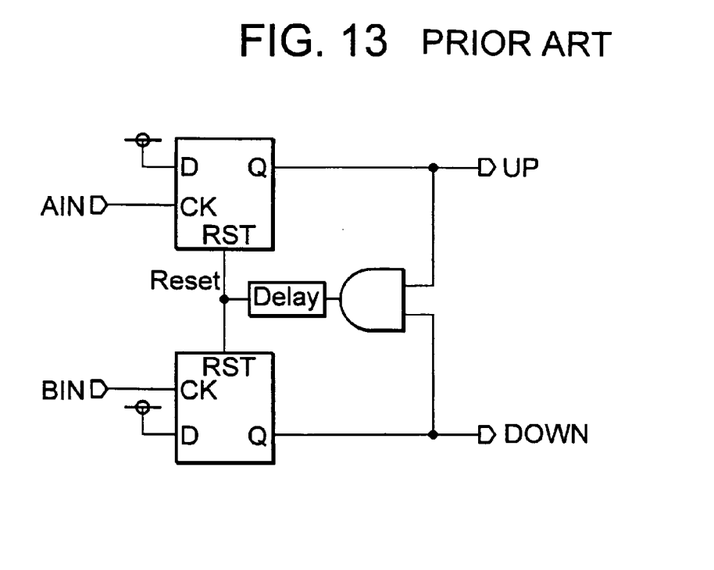
FIG. 13 is a block diagram showing the configuration of an edge comparison type phase frequency detecting circuit.

Usually, this phase detecting circuit has an edge comparison type circuit configuration used for a PLL circuit, such as shown in FIG. 13, in which clock signals are used as its inputs. The phase detecting circuit of this type is often called a phase frequency detector (PFD) because it can lock both phase shift and frequency offset.

Figure 14:
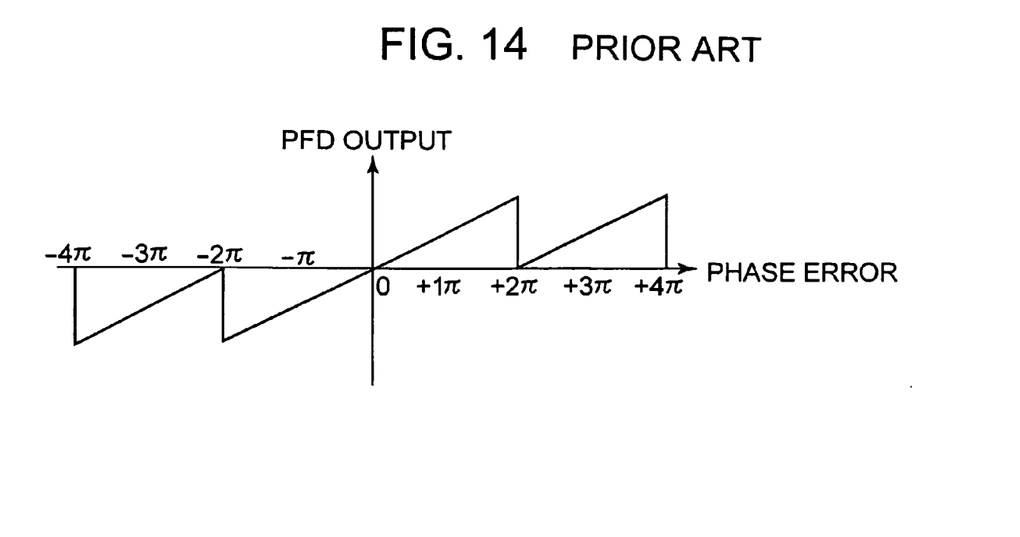
FIG. 14 is a diagram showing the phase detection characteristics of the edge comparison type phase frequency detecting circuit.

The phase detection characteristics of this phase frequency detecting circuit are shown in FIG. 14. As seen from the figure, even if the initial frequency offset is large so as to gradually increase the phase error to go beyond $\pm 2\pi$, the polarity of the PFD output always stays on one side. Since the PFD output average is not "0" as observed over a long period of time, the frequency offset can be corrected later.

However, this phase frequency detecting circuit is only capable of comparing edges between two clock signals, and thus it is not applicable to the read channel block that handles an analog waveform, such as a signal read from a disc, as its input.

Now, let the initial frequency offset in the data synchronizer circuit 200 be discussed. Even if the frequency information is delivered to the voltage-controlled oscillator VCO_sync within the data synchronizer circuit 200 using the frequency synthesizer circuit 300 as mentioned above, due to variations during manufacturing processing, differences in in-chip temperature distribution and the like, the voltage-controlled oscillator VCO_synth within the frequency synthesizer circuit 300 and the voltage-controlled oscillator VCO_sync within the data synchronizer circuit 200 do have oscillating frequencies differing from each other, respectively, i.e., the initial frequency offset is introduced into the data synchronization circuit 200. If this initial frequency offset is large, it is feared, as described earlier, that the phase error detecting circuit of the data synchronizer circuit 200 cannot correct its phase error.

To overcome this situation, measures have been taken to, e.g., lay out both circuits 200 and 300 as close to each other as possible on the chip such that they are less affected by the processing and temperature fluctuations. Also, another solution has been proposed, in which a difference (derivative of a phase error) between the current and the last values that are phase comparison results is added to an original phase error detection output for supply to a PLL loop, whereby a synchronization operation is performed even if a frequency difference for locking is large. See, e.g., Japanese Patent Application Publication No. 11-162122 (Patent Document 1).

As already described, when the initial frequency offset is large, the phase error detection output periodically repeats inversion between the positive and negative polarities as shown in FIG. 11. The derivative of such a periodic function is also a periodic function, and its average is also "0". Hence, frequency locking cannot be implemented even by simply adding the derivative to the phase error detection output.

By contrast, the related art as claimed in claim 1 of Patent Document 1 utilizes the fact that the absolute value of a derivative increases near a bit slip where the polarity of the derivative becomes opposite to what is desired. Then, an arbitrary threshold is given, and when the derivative exceeds the threshold, that derivative is made invalid, whereby it is prevented to make the average equal to "0", and at the same time, it is enabled to select only a value having the desired polarity.

SUMMARY OF THE INVENTION

Figure 15A:
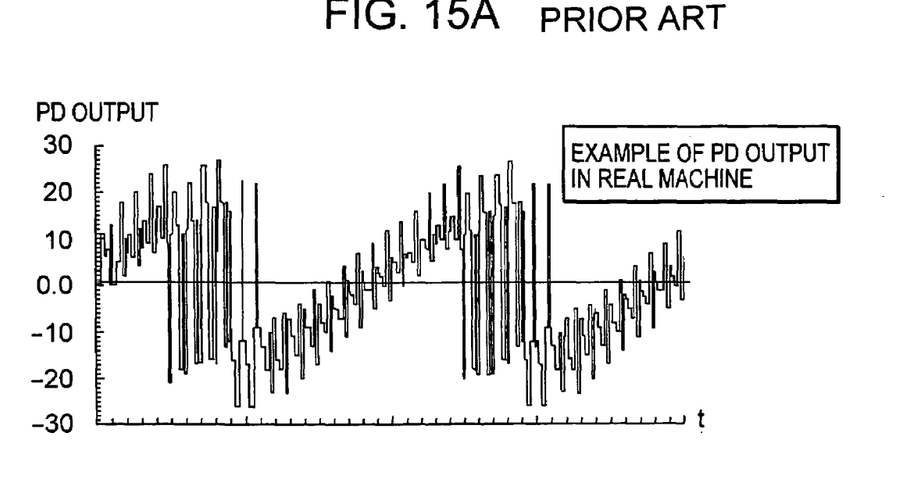
FIGS. 15A and 15B are diagrams showing an example of simulation results for illustrating a problem of the related art.
Figure 15B:
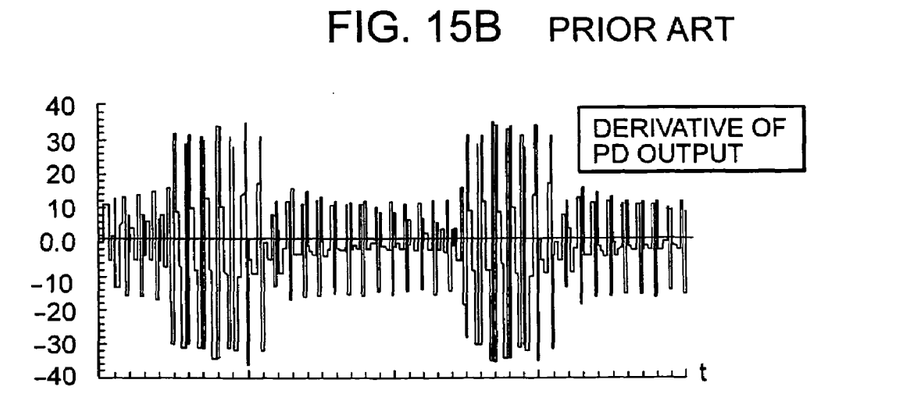

The related art described in Patent Document 1 is based largely on an ideally equalized state of an input signal, in which the phase error detection output affected by a frequency offset monotonously changes, for example. However, in actual applications (e.g., a read channel for optical discs and the like), due to deterioration of the phase equalization characteristics of an input signal and the like, it is very likely that phase error detection output values of respective detection timings greatly fluctuate, as shown in FIG. 15A. And, the derivative obtained from each of such phase error detection output values is only a derivative whose absolute value is relatively large and, additionally, whose polarity extends to both positive and negative sides, as shown in FIG. 15B. Under this situation, it is virtually impossible to select only a desired polarity (the positive side in the example of FIGS. 15A and 15B) by providing a certain threshold, thus leaving still unsolved the basic problem that "the average of the derivatives of a periodic function whose average is '0' also equals '0'".

To overcome this and other problems, the present invention provides a PLL circuit and a recorded information playback apparatus using the PLL circuit, in which the PLL circuit has a phase error detecting circuit capable of frequency locking in a case of a large initial frequency error, even if its phase error detection output values greatly fluctuate due to deterioration of the phase equalization characteristics of an input signal and the like.

The present invention provides a PLL circuit including an analog-to-digital converter that quantizes a signal outputted from reading means with a sampling clock a phase error detecting circuit that detects a phase error between a desired clock and the sampling clock on the basis of a data stream signal resulting from the quantization by the analog-to-digital converter, to output a phase error detection signal, and an oscillator that varies an oscillating frequency thereof according to the phase error detection signal outputted from the phase error detecting circuit and gives the oscillating clock as the sampling clock. In the PLL circuit, the phase error detecting circuit has the following configuration.

The phase error detecting circuit includes phase error detecting means, absolute value comparing means, holding means, anticoincidence detecting means, and polarity inverting means. The phase error detecting means detects the phase error from the data stream signal and a data stream signal that is 1 clock cycle earlier, with absolute value comparing means that detects an absolute value of the phase error detected by the phase error detecting means exceeding a predetermined threshold. The holding means holds a polarity of the phase error detected by the phase error detecting means for a period of the detection by the absolute value comparing means, the polarity being as of a timing of the detection by the absolute value comparing means. The anticoincidence detecting means detects anticoincidence between the polarity held by the holding means and a polarity of the phase error detected by the phase error detecting means. The polarity inverting means provides the phase error detection signal by inverting the polarity of the phase error detected by the phase error detecting means when the anticoincidence detecting means detects the anticoincidence, and provides the phase error detection signal by not inverting the polarity of the phase error detected by the phase error detecting means when the anticoincidence detecting means does not detect the anticoincidence. The PLL circuit is used as a data synchronizer circuit (clock data recovery circuit) in a recorded information playback apparatus.

In the PLL circuit having the above configuration or the recorded information playback apparatus using the PLL circuit, the fact that the absolute value of a phase error exceeds a predetermined threshold means that the phase error is near ±π[rad], i.e., a bit slip is about to occur. And, when the polarity of a phase error as of a timing at which the phase error absolute value exceeds the threshold does not coincide with the polarity of a phase error as of a current timing, it is judged that a bit slip has occurred. The operation of inverting the polarity of the phase error to make the polarity the same as that of the phase error preceding the bit slip is performed until the phase error absolute amount falls below the threshold, thereby realizing the phase error detection characteristics whose vertical balance is lost.

DESCRIPTION OF THE EMBODIMENTS

Embodiments of the present invention will be described below in detail with reference to the drawings.

Figure 1:
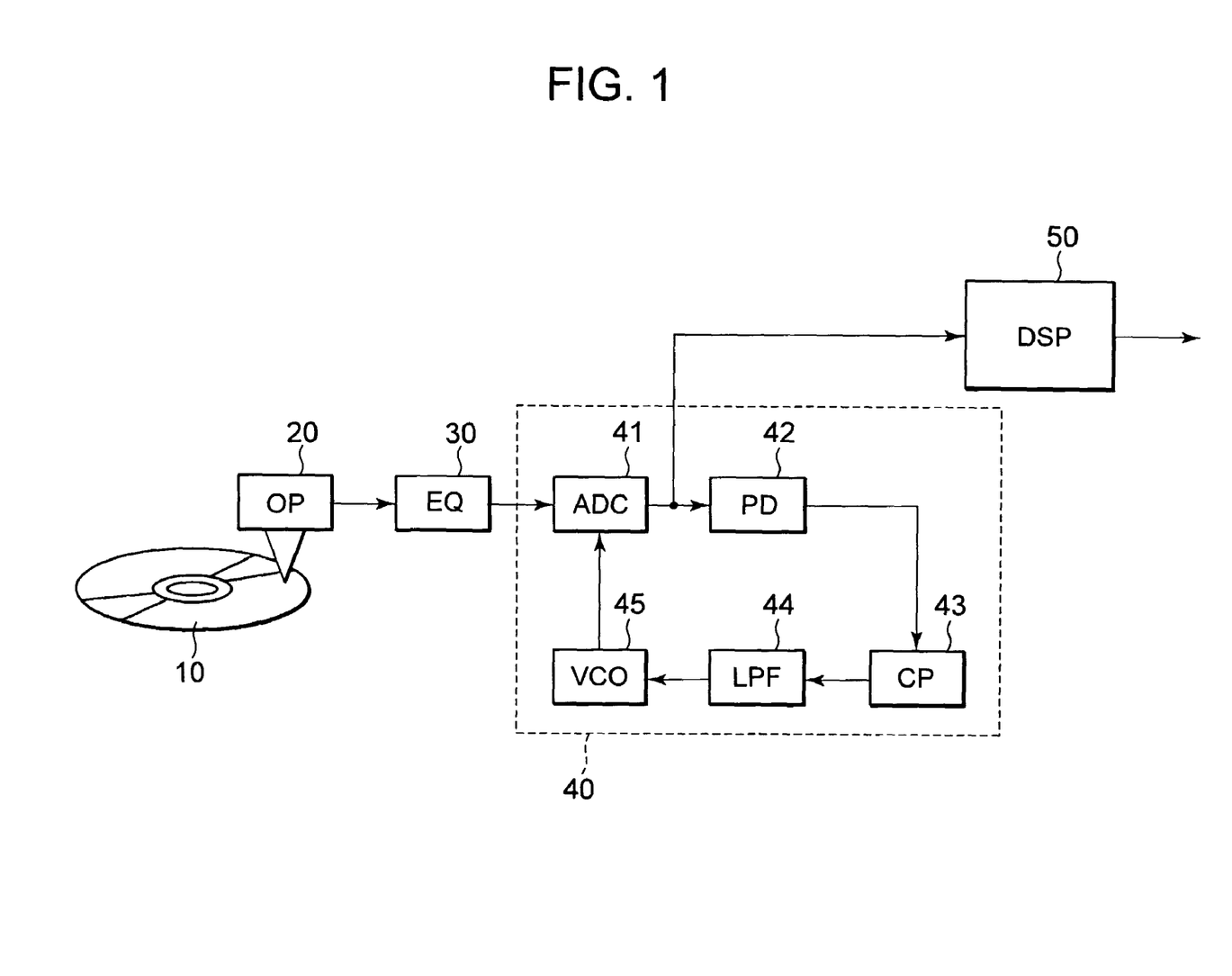
FIG. 1 is a block diagram showing a configuration example of a read channel block of an optical disc player to which the present invention is applied.

FIG. 1 is a block diagram showing a configuration example of a read channel block of a recorded information playback apparatus, e.g., an optical disc player that adopts the PRML system as its reading system, to which the present invention is applied. However, the present invention is not only applicable to optical disc players using an optical disc as a recording medium, but it also may be applicable widely to recorded information players that use a magnetic disk and a magnetic tape as a recording medium and play back information recorded on the recording medium.

In FIG. 1, information recorded on a disc medium 10, such as a DVD or a Blu-ray disc, is read by an optical pickup (OP) 20, and supplied to a data synchronizer circuit (or a clock data recovery circuit) 40 via an equalizer (EQ) circuit 30. The equalizer circuit 30 boosts the high-frequency component of a signal outputted from the optical pickup 20 according to the PR equalizing system.

The data synchronizer circuit 40 is a PLL circuit that includes an ADC (analog-to-digital converter) 41, a phase error detecting (PD) circuit 42, a charge pump (CP) circuit 43, a low-pass filter (LPF) 44 which is a loop filter and a VCO (voltage-controlled oscillator) 45.

In the data synchronizer circuit 40, the ADC 41 quantizes (digitizes) an output signal having an analog waveform from the equalizer circuit 30 to output quantized signals to a downstream digital signal processing (DSP) block 50, and also gives these quantized signals to the phase error detecting circuit 42 for phase error detection. The phase error detecting circuit 42 detects the phase error of an ADC sampling clock from data stream signals being the quantized output signals from the ADC 41. A specific configuration of this phase error detecting circuit 42 is the feature of the present invention, details of which will be described later.

The charge pump circuit 43 converts a phase error detection signal from the phase error detecting circuit 42 into a current signal. The low-pass filter 44 determines the characteristics of the whole loop using the current signal outputted from the charge pump circuit 43. The VCO 45 has its oscillating frequency controlled by an output voltage of the low-pass filter 44. The oscillating clock of the VCO 45 serves as the sampling clock for the ADC 41. That is, the ADC 41 performs its sampling operation with the oscillating clock of the VCO 45.

The PLL circuit is formed of the ADC 41, phase error detecting circuit 42, charge pump circuit 43, low-pass filter 44, VCO 45, respectively in a loop configuration. And, the data synchronizer circuit 40 formed of this PLL circuit feedback-controls the phase of the oscillating clock of the VCO 45 so that a waveform read from the disc medium 10 can be sampled at correct timings.

In this data synchronizer circuit 40, as a basic concept, the phase error detecting circuit 42 detects a phase error exceeding ±π, i.e., an occurrence of a bit slip. Additionally, upon occurrence of a bit slip, by appropriately processing a phase error detection output (hereinafter denoted "PD output"), the phase error detecting circuit 42 is configured to detect not only a phase shift but also a frequency offset. That is, as described earlier (see FIG. 11), the phenomenon is utilized that when a bit slip occurs, the polarities change with the phase errors taking large absolute values.

Figure 2:
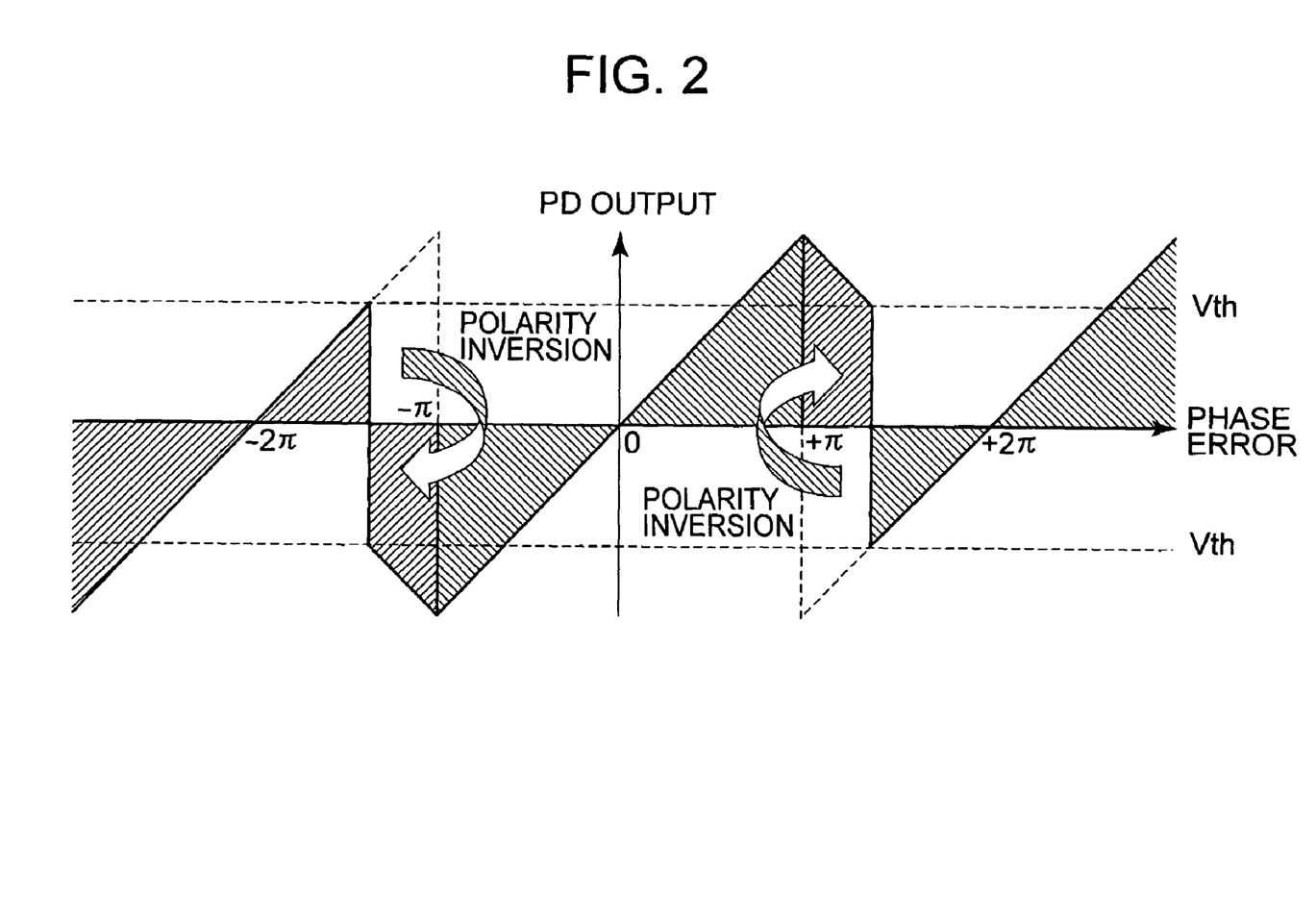
FIG. 2 is a diagram showing the phase error detection characteristics of a phase error detecting circuit used for a PLL circuit according to an embodiment of the present invention.

As shown in FIG. 2, first, a certain arbitrary threshold Vth is set for PD output values. And, a condition in which phase errors are outputted while exceeding the threshold Vth means a condition in which the phase errors are near ±π[rad], i.e., a bit slip is about to occur. Then, when the phase error aggravates from this situation due to a frequency offset to invert the polarity of a PD output, it is determined that the bit slip has occurred at that timing, whereby the polarity of the PD output is inverted to put the polarity back to what it was before the bit slip has occurred.

Let it be assumed, e.g., that the threshold Vth is set to +16 and the PD output at a certain timing is +19, which is a value exceeding the threshold Vth. The presence of a frequency offset constantly increases the phase error. Then, it is assumed that the phase error detecting circuit 42 calculates, at a next timing, a phase error value that is −18 for output. The phase error detecting circuit 42 judges that a bit slip is deemed to have occurred due to the phase error exceeding +π and thus outputs +18 as its final PD output, giving it the same polarity as that of +19 which is the calculation result preceding the bit slip.

This operation is performed until the phase error absolute amount falls below the threshold Vth. By doing so, the phase error detection characteristics are made to loose their vertical balance, to prevent the PD output average from equaling "0" even if the phase error increases beyond ±π due to the initial frequency offset. Hence, the frequency-locking characteristics can be improved. Specific embodiments of the phase error detecting circuit 42 which realize this will be described below.

Embodiment 1

Figure 3:
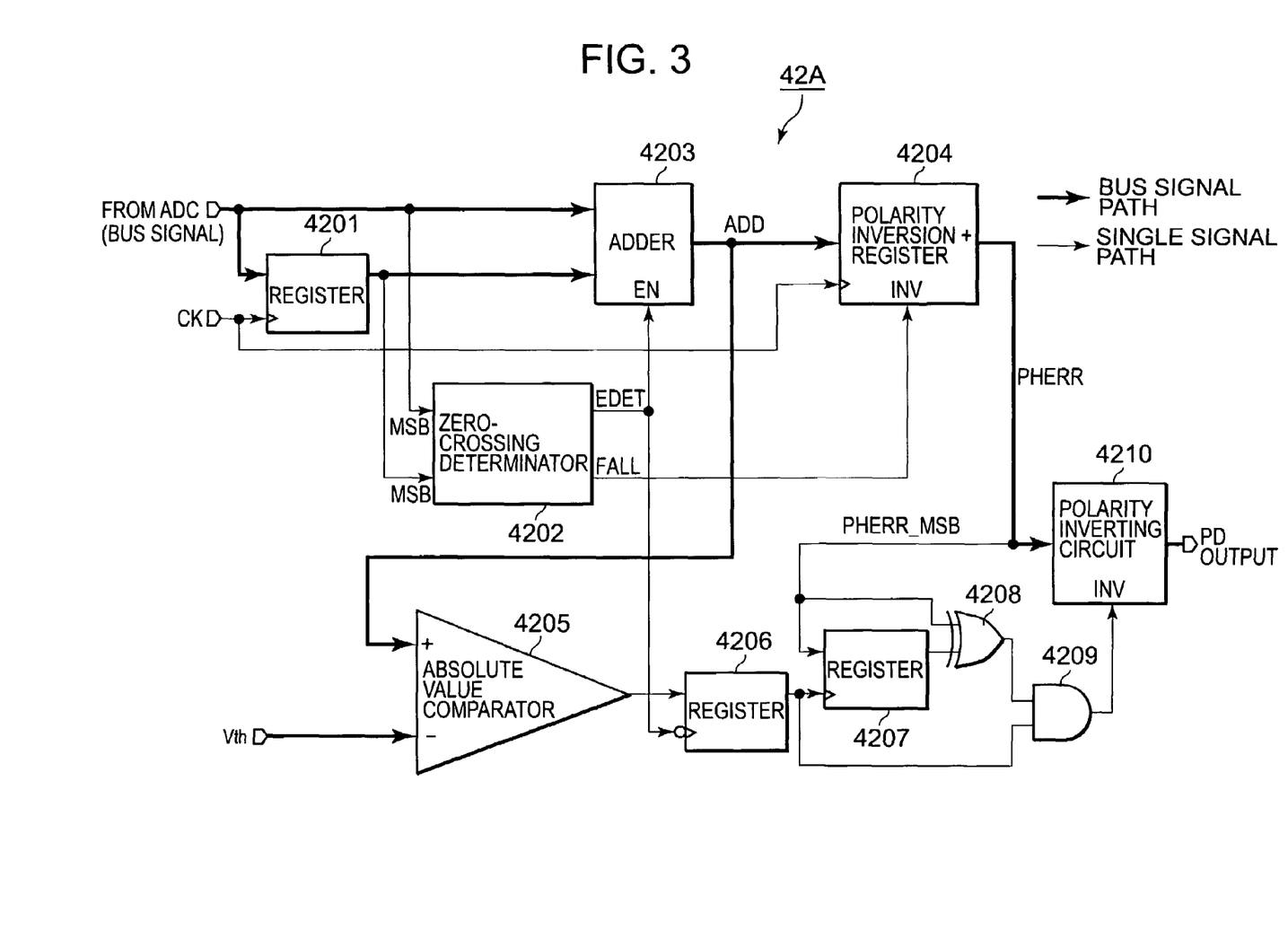
FIG. 3 is a block diagram showing a circuit example of the phase error detecting circuit according to Embodiment 1.

FIG. 3 is a block diagram showing a circuit example of a phase error detecting circuit 42A according to Embodiment 1. In this circuit example, a signal given by the ADC 41 to the phase error detecting circuit 42A is represented in two complements. Also, the heavy lines in the figure each represent a bus signal path.

As shown in FIG. 3, the phase error detecting circuit 42A according to Embodiment 1 includes a register 4201, a zero crossing determinator 4202, an adder 4203, a polarity inverting register 4204, an absolute value comparator 4205, registers 4206, 4207, an anticoincidence detecting circuit 4208, an AND circuit 4209 and a polarity inverting circuit 4210, and is configured to perform circuit operations using the oscillating clock of the VCO 45 of FIG. 1, i.e., the sampling clock for the ADC 41, as a clock CK.

The register 4201 holds a data stream signal supplied from the ADC 41 for a period of 1T. The zero crossing determinator 4202 makes a comparison between a current value and a 1T-earlier value using the polarity-indicating MSBs of data stream signals supplied from the ADC 41 to determine whether or not a zero crossing has occurred and whether the zero crossing has occurred at the rising or falling of a waveform. In this example, it is assumed that the EDET signal is set to "1" when a zero crossing has occurred and the FALL signal is set to "1" when the zero crossing has occurred at the falling of the waveform.

The adder 4203 uses two inputs: a data stream signal supplied from the ADC 41; and the 1T-earlier data stream signal supplied via the register 4201. When the EDET signal is "1", the two inputs are added to output a sum ADD as a phase error. The polarity inverting register 4204 does not invert the polarity of the sum ADD if the FALL signal is "0", but inverts the polarity if the FALL signal is "1" and holds the sum ADD as a PHERR signal for output. That is, the adder 4203 has a function as a phase error detecting means that detects a phase error from a data stream signal supplied from the ADC 41 and a data stream signal that is 1 clock cycle earlier.

The absolute value comparator 4205 compares the sum ADD (phase error) from the adder 4203 with an arbitrary threshold Vth given from outside the phase error detecting circuit 42A, and outputs "1" when an absolute value (hereinafter denoted as "phase error absolute value") of the sum ADD exceeds the threshold Vth. The register 4206 holds the output signal of the absolute value comparator 4205 at a falling timing of the EDET signal, and holds and keeps outputting the output signal of the absolute value comparator 4205 while the subsequent phase error absolute values exceed the threshold Vth.

The register 4207 holds a PHERR_MSB indicating the polarity of the PHERR signal outputted from the polarity inverting register 4204 at a rising timing of the output signal of the register 4206, i.e., at a timing at which a phase error absolute value exceeds the threshold Vth. That is, the register 4207 has a function as a holding means that holds the sum ADD of the adder 4203 as of a timing at which the absolute value comparator 4205 detects a phase error absolute value that has exceeded the threshold Vth, specifically, the polarity of a PHERR signal outputted from the polarity inverting register 4204, for a period during which the absolute value comparator 4205 keeps the detection, i.e., while the subsequent phase error absolute values exceed the threshold Vth.

The anticoincidence detecting circuit 4208 compares the output signal of the register 4207, i.e., the polarity of the PHERR signal as of the timing at which the phase error absolute value exceeds the threshold Vth, with the polarity of a current PHERR signal, and outputs "0" if they are the same, and "1" if they are not the same. Anticoincidence judged by this anticoincidence detecting circuit 4208 means that it is determined that a bit slip has occurred. That is, the anticoincidence detecting circuit 4208 has a function as an anticoincidence detecting means that detects anticoincidence between the polarity of a PHERR signal held by the register 4207 and the polarity of a PHERR signal outputted from the polarity inverting register 4204.

The AND circuit 4209 outputs the detection result of the anticoincidence detecting circuit 4208 only while the output signal of the register 4206 is "1", i.e., only while the subsequent phase error absolute values exceed the threshold Vth. The polarity inverting circuit 4210 judges that a bit slip has occurred if the output of the AND circuit 4209 is "1", and thus inverts the polarity of the PHERR signal, or if the output of the AND circuit 4209 is "0", uses the PHERR signal without inverting its polarity as the final PD output.

In the phase error detecting circuit 42A having the above-described configuration, a data stream signal supplied from the ADC 41 is held by the register 4201 for 1T, whether or not a zero crossing has occurred, and whether the zero crossing has occurred at the rising or falling timing of an input waveform is determined by the zero crossing determinator 4204 that compares the current value and the 1T-earlier value of the MSBs, each indicating the polarity.

Meanwhile, in the adder 4203, a signal supplied from the ADC 41 and the signal that is 1T earlier are added when the EDET signal is "1", and a sum ADD is outputted as a phase error. The polarity of the sum ADD is not inverted by the polarity inverting register 4204 when the FALL signal is "0", but is inverted when the FALL signal is "1", for output as a PHERR signal.

Furthermore, a phase error absolute value which is the sum ADD of the adder 4203 is compared with an arbitrary threshold Vth by the absolute value comparator 4205, and when the phase error absolute value exceeds the threshold Vth, "1" is outputted. Here, the fact that the phase error absolute value exceeds the threshold Vth means that the phase error is near ±π[rad], i.e., that a bit slip is about to occur.

Then, the polarity of a PHERR signal as of the timing at which the phase error absolute value exceeds the threshold Vth is compared with the polarity of a PHERR signal as of a current timing by the anticoincidence detecting circuit 4208, and it is judged that a bit slip has occurred when the polarities are not the same. This judgment (anticoincidence detection result) is outputted via the AND circuit 4209 only while the subsequent phase error absolute values exceed the threshold Vth. Since it is determined that a bit slip has occurred if the output of this AND circuit 4209 is "1", the polarity of the PHERR signal is inverted by the polarity inverting circuit 4210 to provide the final PD output.

A condition in which phase error absolute values are outputted while exceeding the threshold Vth means a condition in which the phase errors are near ±π[rad], i.e., that a bit slip is about to occur. Thus, the phase error further increases from that condition due to a frequency offset, and when the polarity of a PHERR signal as of the timing at which the phase error absolute value exceeds the threshold Vth is not the same as the polarity of a PHERR signal as of a current timing, i.e., when the polarity of the PHERR signal is inverted, it is determined that a bit slip has occurred at that timing. Hence, by performing the operation of inverting the polarity of the PHERR signal to give the PHERR signal the same polarity as that of the PHERR signal preceding the bit slip until the phase error absolute amount falls below the threshold Vth, the phase error detection characteristics shown in FIG. 2 can be realized.

As is apparent from FIG. 2, the phase error detection characteristics of the phase error detecting circuit 42A according to the present Embodiment 1 are not balanced vertically. That is, even if PD output values greatly fluctuate due to deterioration of the phase equalization characteristics of an input signal and the like, the phase error detection characteristics whose vertical balance is lost can be realized. As a result of the realization of such phase error detection characteristics, even if the phase error increases while exceeding ±π due to an initial frequency offset, the PD output average can be prevented from equaling "0". Therefore, the frequency-locking characteristics can be improved. The phase error detection characteristics shown in FIG. 2 are close to the phase error detection characteristics shown in FIG. 14 in the sense that the PD output average obtained when the phase error greatly aggravates due to a frequency error that gets out of "0", and hence may contribute to improving the frequency-locking performance.

Thus, by providing the phase error detecting circuit 42A with the frequency-locking characteristics, malfunction of the data synchronizer circuit 40 in a case of a large initial frequency offset can be prevented. Furthermore, depending on operating conditions, it is not necessary to additionally provide a frequency synthesizer circuit, such as the one shown in FIG. 12, thus contributing to a significant reduction in the number of circuits and the level of power consumption of the data synchronizer circuit 40.

However, if an initial frequency error is extremely large, it is preferable to additionally provide the frequency synthesizer circuit as shown in FIG. 12. If the frequency synthesizer circuit is additionally provided in this way, even when an operating sequence is passed to the data synchronizer circuit 40 with the frequency synthesizer circuit not strictly frequency-locked, the data synchronizer circuit 40 can sufficiently lock the phase because the circuit 40 has the phase error detecting circuit 42A, thus contributing to a reduction of time to be spent for the operating sequence of the entire read channel block.

Furthermore, the frequency-locking function is realized only by digital computation adapted to CMOS devices, and hence power-saving and stable operation can be expected.

In the above-described phase error detecting circuit 42A according to Embodiment 1, a configuration is adopted in which the threshold Vth for bit slip detection is given from outside. However, since phase error computations largely depend on the amplitude of an input signal to the ADC 41, it is feared that the bit slip detecting function will not operate correctly if the amplitude is unexpectedly large or small.

As mentioned earlier, assuming that the reference clock width is 1T, in optical discs, a data width of 3T to 11T is recorded on a DVD and a data width of 2T to 8T is recorded on a Blu-ray disc, for example, depending on their recording system. Due to the performance of the optical pickup 20 and the like, a signal having a higher frequency component, i.e., a 3T signal for a DVD or a 2T signal for a Blu-ray disc, has a smaller amplitude compared with other signals. Therefore, the threshold Vth must be set to a value that can fully cover the maximum phase error value calculated using a signal having a minimum amplitude in the system concerned.

Thus, in order for the bit slip detecting function to operate correctly even if the amplitude of an input signal to the ADC 41 is unexpectedly large or small, a mechanism is provided which automatically calculates a proper threshold Vth in a phase error detecting circuit according to Embodiment 2, as described below.

Embodiment 2

Figure 4:
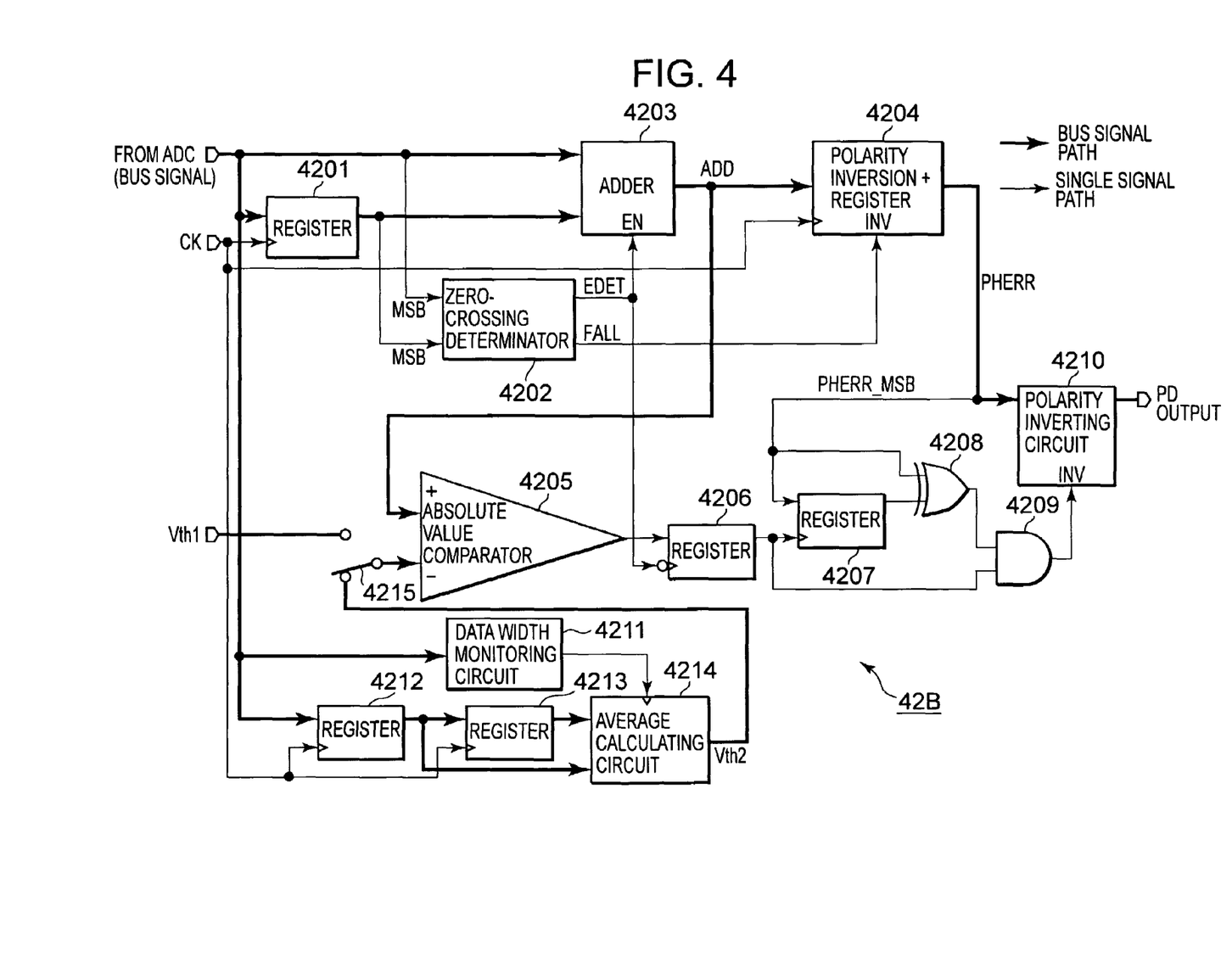
FIG. 4 is a block diagram showing a circuit example of the phase error detecting circuit according to Embodiment 2.

FIG. 4 is a block diagram showing a circuit example of a phase error detecting circuit 42B according to Embodiment 2, in which components equivalent to those in FIG. 3 are given the same reference symbols. Also, in this circuit example, it is assumed that a signal given to the phase error detecting circuit 42B from the ADC 41 of FIG. 1 is represented in two complements. Moreover, the heavy lines represent a bus signal path respectively.

As shown in FIG. 4, the phase error detecting circuit 42B according to Embodiment 2 includes a data width monitoring circuit 4211, registers 4212, 4213, an average calculating circuit 4214 and a selector switch 4215, in addition to the components of the phase error detecting circuit 42A according to Embodiment 1, i.e., the register 4201, the zero crossing determinator 4202, the adder 4203, the polarity inverting register 4204, the absolute value comparator 4205, the registers 4206, 4207, the anticoincidence detecting circuit 4208, the AND circuit 4209 and the polarity determining circuit 4210, and has a configuration compatible with, e.g., a Blu-ray disc whose minimum data width is 2T.

The data width monitoring circuit 4211 monitors the data widths of data stream signals which are output signals of the ADC 41, and gives a trigger signal to the average calculating circuit 4214 when judging that a signal having the minimum width, e.g., 2T has arrived. The register 4212 holds a data stream signal inputted from the ADC 41 for 1T. The register 4213 holds the data stream signal held by the register 4212 for another 1T. The average calculating circuit 4214, using two sampled data items for the 2T signals held by the registers 4212, 4213, calculates their average when given the trigger signal from the data width monitoring circuit 4211, and outputs the average as a threshold Vth.

The above-mentioned data width monitoring circuit 4211, registers 4212, 4213 and average calculating circuit 4214 form a threshold setting circuit that automatically sets an optimal value as a threshold Vth on the basis of data stream signals inputted from the ADC 41.

In this threshold setting circuit, the data width of a data stream signal is monitored using the data width monitoring circuit 4211 that counts the data width of the data stream signal inputted from the ADC 41, and when it is judged that a 2T signal is a signal having the minimum width has arrived, two sampled data items for 2T signals held by the registers 4212, 4213 are used by the average calculating circuit 4214 to calculate their average, and the average is set as a threshold Vth.

This will be illustrated using an example in which the input waveform shown in FIGS. 7 to 10, whose data amplitude is 20, is sinusoidal. As shown in FIG. 9, when the sampling clock is largely out of phase, the average of 2T signals equals 10, e.g., 20÷2=10 from y[2]=+19 and y[3]=+1. Meanwhile, as shown in FIG. 7, when the sampling clock is phase-locked, the average equals 14, which is $\sqrt{2}$ times that of the case where the sampling clock is out of phase.

Thus, in the phase error detecting circuit 42B according to Embodiment 2, which has the function of automatically setting an optimal threshold Vth at all times, the following two advantages can be obtained, in addition to the advantages obtained by the phase error detecting circuit 42A according to Embodiment 1.

First, even if the data amplitude varies during reading of data from a disc, the threshold Vth automatically follows the varied amplitude. Second, the threshold vth becomes relatively small in a case of a large phase shift, and thereby, as shown in FIG. 2, an area for inverting the polarity increases compared with that in the phase detection characteristics of the original phase error detecting circuit, so as to implement a quick frequency-locking performance. On the other hand, the threshold Vth becomes relatively large when the phase becomes locked, thereby the circuit 42B is less responsive to sudden invalid PD outputs due to noise or the like.

Figure 5:
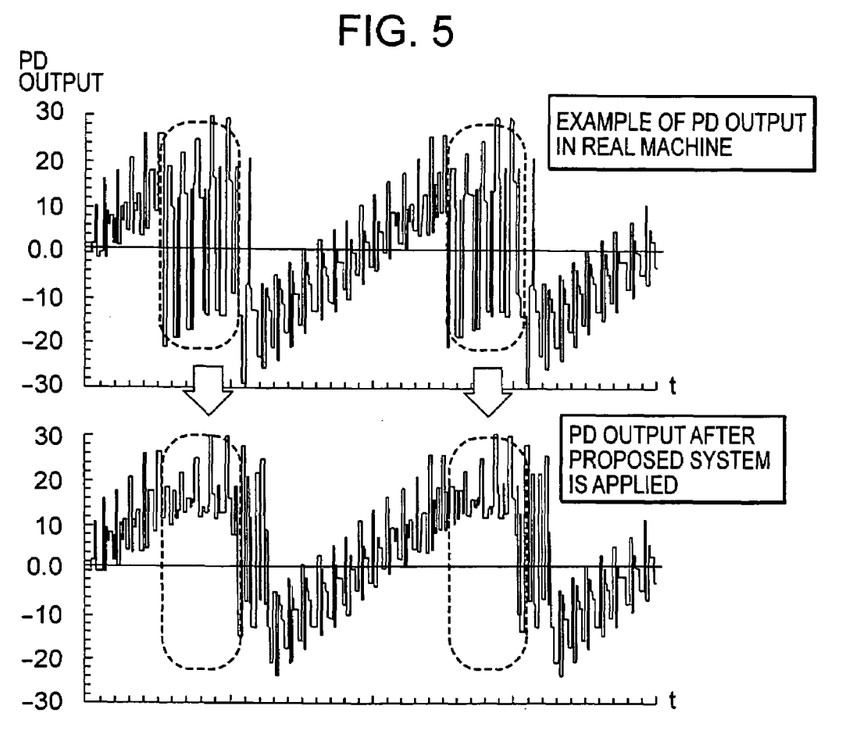
FIG. 5 is a diagram showing an example of simulation results obtained when Embodiment 2 is applied.

FIG. 5 is a diagram showing an example of simulation results obtained when the present Embodiment 2 is applied to the PD output shown in FIG. 15A. Observing these simulation results, the polarity is inverted in PD operations near bit slips shown by the broken lines, and as a result, the vertical balance of the PD output values is lost, from which the phenomenon shown in FIG. 2 which is the aim of the present invention can be witnessed.

The selector switch 4215 selects one of a threshold Vth1 given from outside the present phase error detecting circuit 42B and a threshold Vth2 automatically set by the threshold setting circuit, and gives the selected threshold to the absolute value comparator 4205 as a threshold Vth for bit slip detection. Using the selector switch 4215, and user makes a selection as to whether the threshold Vth1 arbitrarily set externally or the threshold Vth2 automatically set on the basis of data stream signals inputted from the ADC 41 is given as the threshold Vth for bit slip detection.

Note that the descriptions of the present embodiments are based on the case where the present embodiments are applied to the data synchronizer circuit (or the clock data recovery circuit) in the Blu-ray disc system in which reading is based on the PR {1, 2, 1} equalizing system. However, the basic configuration of the present embodiments, in which it is judged that a bit slip has occurred when a phase error has its polarity inverted with its absolute value exceeding a certain threshold and the threshold is automatically computed from the amplitude of input data, of course, may be applicable widely to other similar data synchronizer circuits as well.

According to the embodiment of the present invention, even if the phase error detection output values greatly fluctuate due to deterioration of the phase equalization characteristics of an input signal and the like, the phase error detection characteristics whose vertical balance is lost can be realized, and thus frequency locking can be performed reliably in a case of a large initial frequency error.

It should be understood by those skilled in the art that various modifications, combinations, subcombinations and alterations may occur depending on design requirements and other factors insofar as they are within the scope of the appended claims or the equivalents thereof.

What is claimed is:

1. A PLL circuit comprising:
   an analog-to-digital converter that quantizes a signal read from a recording medium using a sampling clock;
   a phase error detecting circuit that detects a phase error between a desired clock and the sampling clock on the basis of a data stream signal resulting from the quantization by the analog-to-digital converter, to output a phase error detection signal; and
   an oscillator that varies an oscillating frequency thereof in accordance with the phase error detection signal outputted from the phase error detecting circuit, and gives the oscillating clock as the sampling clock, wherein the phase error detecting circuit includes:

phase error detecting means that detects the phase error from the data stream signal and a data stream signal that is 1 clock cycle earlier;

absolute value comparing means that detects an absolute value of the phase error detected by the phase error detecting means exceeding a predetermined threshold;

holding means that holds a polarity of the phase error detected by the phase error detecting means for a period of the detection by the absolute value comparing means, wherein the polarity is as of a timing of the detection by the absolute value comparing means;

anticoincidence detecting means that detects anticoincidence between the polarity held by the holding means and a polarity of the phase error detected by the phase error detecting means; and polarity inverting means that provides the phase error detection signal by inverting the polarity of the phase error detected by the phase error detecting means when the anticoincidence detecting means detects the anticoincidence, and provides the phase error detection signal without inverting the polarity of the phase error detected by the phase error detecting means when the anticoincidence detecting means does not detect the anticoincidence.

2. The PLL circuit according to claim 1, wherein the phase error detecting circuit further includes:

threshold setting means that automatically sets an optimal value as the threshold on the basis of the data stream signal.

3. A recorded information playback apparatus comprising:

reading means that reads recorded information from a recording medium; and a PLL circuit including an analog-to-digital converter that quantizes a signal outputted from the reading means using a sampling clock; a phase error detecting circuit that detects a phase error between a desired clock and the sampling clock on the basis of a data stream signal resulting from the quantization by the analog-to-digital converter, to output a phase error detection signal; and an oscillator that varies an oscillating frequency thereof in accordance with the phase error detection signal outputted from the phase error detecting circuit, and gives the oscillating clock as the sampling clock, wherein the phase error detecting circuit includes:

phase error detecting means that detects the phase error from the data stream signal and a data stream signal that is 1 clock cycle earlier;

absolute value comparing means that detects an absolute value of the phase error detected by the phase error detecting means exceeding a predetermined threshold;

holding means that holds a polarity of the phase error detected by the phase error detecting means for a period of the detection by the absolute value comparing means, wherein the polarity is as of a timing of the detection by the absolute value comparing means;

anticoincidence detecting means that detects anticoincidence between the polarity held by the holding means and a polarity of the phase error detected by the phase error detecting means; and polarity inverting means that provides the phase error detection signal by inverting the polarity of the phase error detected by the phase error detecting means when the anticoincidence detecting means detects the anticoincidence, and provides the phase error detection signal without inverting the polarity of the phase error detected by the phase error detecting means when the anticoincidence detecting means does not detect the anticoincidence.

4. The recorded information playback apparatus according to claim 3, wherein the phase error detecting circuit further includes:

threshold setting means that automatically sets an optimal value as the threshold on the basis of the data stream signal.

5. A PLL circuit comprising:

an analog-to-digital converter that quantizes a signal read from a recording medium using a sampling clock;

a phase error detecting circuit that detects a phase error between a desired clock and the sampling clock on the basis of a data stream signal resulting from the quantization by the analog-to-digital converter, to output a phase error detection signal; and an oscillator that varies an oscillating frequency thereof in accordance with the phase error detection signal outputted from the phase error detecting circuit, and gives the oscillating clock as the sampling clock, wherein the phase error detecting circuit includes:

a phase error detecting circuit that detects the phase error from the data stream signal and a data stream signal that is 1 clock cycle earlier;

an absolute value comparing circuit that detects an absolute value of the phase error detected by the phase error detecting means exceeding a predetermined threshold;

a register that holds a polarity of the phase error detected by the phase error detecting means for a period of the detection by the absolute value comparing means, wherein the polarity is as of a timing of the detection by the absolute value comparing means;

an anticoincidence detecting circuit that detects anticoincidence between the polarity held by the holding means and a polarity of the phase error detected by the phase error detecting means; and a polarity inverting circuit that provides the phase error detection signal by inverting the polarity of the phase error detected by the phase error detecting means when the anticoincidence detecting means detects the anticoincidence, and provides the phase error detection signal without inverting the polarity of the phase error detected by the phase error detecting means when the anticoincidence detecting means does not detect the anticoincidence.

* * * * *